W. BROCKLESBY, Jr.
Truck for Sacking and Moving Grain.
No. 88,841.
Patented April 13, 1869.
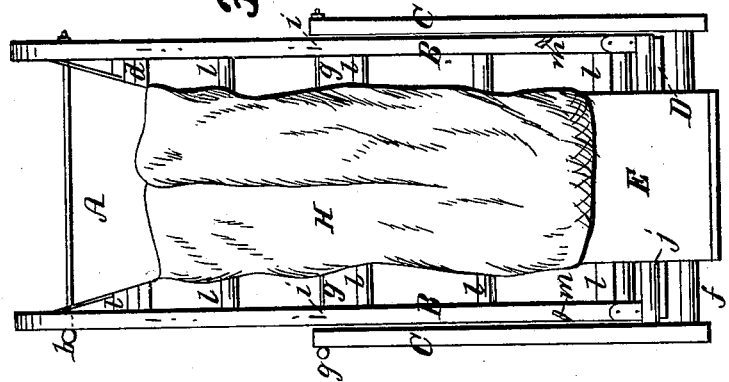
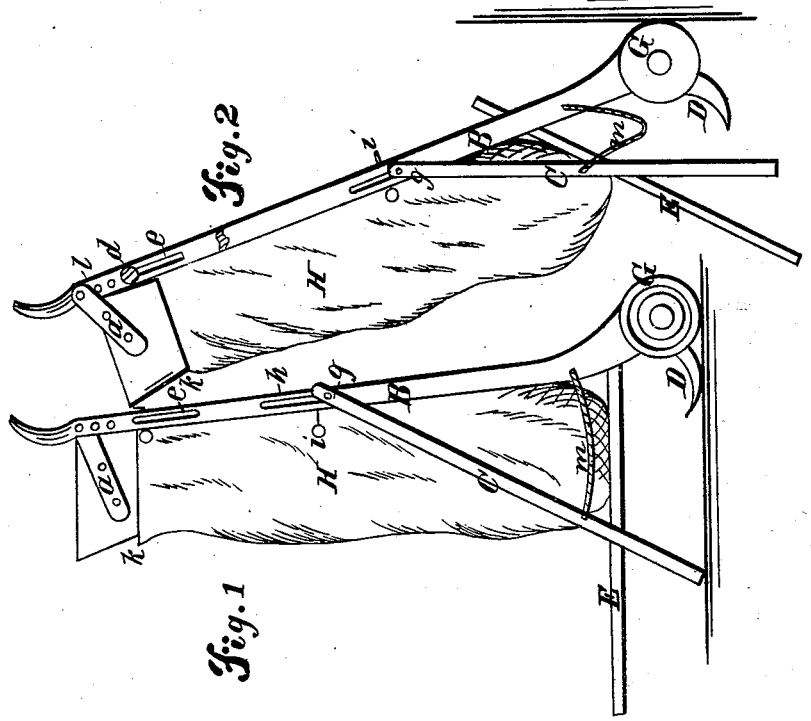

WILLIAM BROCKLESBY, JR., OF CALEDONIA, OHIO.

Letters Patent No. 88,841, dated April 13, 1869.

IMPROVED HAND-TRUCK FOR SACKING GRAIN, AND MOVING THE SAME.

The Schedule referred to in these Letters Patent and making part of the same.

*To all whom it may concern:*

Be it known that I, WILLIAM BROCKLESBY, Jr., of Caledonia, in the county of Marion, and State of Ohio, have invented a new and improved Hand-Truck for Sacking Grain, and Moving the Same; and I do hereby declare that the following is a full, clear, and exact description thereof, which will enable others skilled in the art to make and use the same, reference being had to the accompanying drawings, forming part of this specification, in which—

Figure 1 is a side view of my invention, when in a vertical position for filling sacks.

Figure 2 is a view of the same, when inclined for transporting the filled sack.

Figure 3 is a front view of the truck and rack, when inclined as in fig. 2.

Similar letters of reference indicate like parts.

The object of this invention is to provide a simple and efficient hand-truck, whereby grain, or other analogous matter, may be sacked and transported to any part of a warehouse, mill, barn, or other building, with convenience and dispatch.

It consists in the application to a common hand-truck of a hopper for filling the sack, adjustable braces for holding the truck in an upright position while the sack is being filled, and a foot-board, or treadle, for lifting the filled sack, so that it may be easily detached from the hopper.

In the drawings—

A is the hopper, affixed to the side-pieces B of the truck, by means of plates $a$, affixed to the hopper, and held by a rod, $b$, passing through the holes in the said plates, and through any opposite two of a series of holes in the side-pieces B, near the handle of the same, as shown.

The hopper thus hangs on a hinge, and rests on a round, $d$, the ends of which are formed with tenons fitting in slots $e$, and held therein by pins through any one pair of a series of holes passing through the side-pieces A, and across the slot, whereby the round $d$ is made adjustable up or down, to correspond with the hopper, when suitably adjusted.

The adjustments are made to suit sacks of different lengths.

C are the braces, having a bottom round, $f$, or cross-brace, and are attached to the truck by a rod, $g$, passing through the upper end of the said braces, and through slots $h$, in the side-pieces B.

Pins $i$ confine the rod at the upper or lower ends of the slots, as occasion requires, for, if the braces are not needed, they can be taken up, in the manner described, to bring the lower round $f$, within the bottom plate D of the truck, which latter can then be used as a common hand-truck.

The foot-board E is attached, by dowels, to a rotating round, $j$, the reduced circular ends of which fit loosely in holes in the braces C.

This round furnishes a pivot, or fulcrum, on which the foot-board acts as a lever, to raise the filled sack, one end of the said board projecting backward under the sack, and the other projecting outward in front, thus affording a point of application of the foot to raise the sack.

The object of raising the sack is to free its mouth from the hopper, the said mouth being drawn around the flange, or moulding, at the base of the hopper, and the lapped parts hooked, and hook $k$ affixed to the front of the hopper.

$l\ l\ l\ l\ l$ are the fixed rounds of the truck, and G are the wheels of the same.

$m$ are stay-cords, or straps to keep the braces from spreading too far.

The foot-board may be detached by lifting its dowels from the holes in the round F.

H is a sack, shown attached to the hopper.

Fig. 1 shows the sack and truck in position for filling, and figs. 2 and 3 show the truck, the sack being transported.

The foot-board, braces, and hopper may all be detached, thus leaving the truck available as a common hand-truck.

Having thus described my invention,

I claim as new, and desire to secure by Letters Patent—

The adjustable hopper A, adjustable braces C, and foot-board E, in combination with a hand-truck, substantially as shown and described.

WILLIAM BROCKLESBY, JR.

Witnesses:
WILLIAM H. WARWICK,
WILLIAM BROCKLESBY, Sr.